(12) United States Patent
Jhang et al.

(10) Patent No.: US 8,275,820 B2
(45) Date of Patent: Sep. 25, 2012

(54) VARIABLE LENGTH FFT SYSTEM AND METHOD

(75) Inventors: Jhih-siang Jhang, Taipei (TW);
Jui-Ming Wei, Taichung (TW);
Ming-hung Li, Wurih Township (TW)

(73) Assignee: MEDIATEK Inc., Hsin-Chu (TW)

( * ) Notice: Subject to any disclaimer, the term of this patent is extended or adjusted under 35 U.S.C. 154(b) by 1261 days.

(21) Appl. No.: 11/853,537

(22) Filed: Sep. 11, 2007

(65) Prior Publication Data
US 2009/0013021 A1 Jan. 8, 2009

Related U.S. Application Data

(60) Provisional application No. 60/948,414, filed on Jul. 6, 2007.

(51) Int. Cl.
*G06F 17/14* (2006.01)
(52) U.S. Cl. ........................................................ 708/404
(58) Field of Classification Search ........... 708/400–409
See application file for complete search history.

(56) References Cited

U.S. PATENT DOCUMENTS

| 5,163,017 | A | 11/1992 | Wong et al. |
| 5,430,667 | A | 7/1995 | Takano |
| 6,931,055 | B1 | 8/2005 | Underbrink et al. |
| 7,024,443 | B2 | 4/2006 | Davey et al. |
| 2004/0001557 | A1* | 1/2004 | Sunwoo ................... 375/295 |
| 2004/0133615 | A1 | 7/2004 | Hsieh et al. |
| 2007/0041460 | A1 | 2/2007 | Olesen et al. |
| 2008/0155003 | A1* | 6/2008 | Lai et al. ................... 708/404 |

OTHER PUBLICATIONS

An-Yeu and Jen-Chih Kuo, "VLSI Design of a Variable-Length FFT/IFFT Processor for OFDM-Based Communication Systems," EURASIP Journal on Applied Signal Processing, 2003.
Chao-Kai Chang and Chung-Ping Hung, "An Efficient Memory-Based FFT Architecture," IEEE, 2003.
S. He and M. Torkelson, "A new approach to pipeline FFT processor," IEEE Int. Parallel Processing Symp., pp. 776-770, Apr. 1996.

* cited by examiner

*Primary Examiner* — Tan V. Mai

(57) ABSTRACT

A variable length fast Fourier transform (FFT) system and a method for performing the FFT system in a global navigation satellite system (GNSS) signal acquisition and tracking, which includes a memory and a number of processing elements are disclosed. Based on the GNSS signal tracking, the variable length FFT system performs a first FFT operation together with a first data length. Based on the GNSS signal acquisition, the variable length FFT system is divided into several FFT subsystems to simultaneously perform different operations with various data lengths different from the first data length. Thus, the variable length FFT system can enhance the hardware utility and increase throughputs.

29 Claims, 11 Drawing Sheets

VARIABLE LENGTH FFT SYSTEM AND METHOD

CROSS-REFERENCE TO RELATED APPLICATION

The present application claims the benefit of the filing date under 35 U.S.C. §119(e) of a Provisional U.S. Patent Application No. 60/948,414, filed Jul. 6, 2007, which is incorporated by reference herein.

FIELD OF THE INVENTION

This present invention relates to a variable length fast Fourier transform (FFT) system and a method of performing the same, and especially for global navigation satellite system (GNSS) signal acquisition and tracking.

DESCRIPTION OF THE PRIOR ART

As well known, an orthogonal frequency division multiplexing (OFDM) technology for multi-carrier modulation has been widely utilized for various signal-processing or telecommunication apparatus including, for example, a wireless transmitter/receiver, digital data broadcasting, various kinds of Global Navigation satellite system (GNSS) and so on. The known Global Navigation satellite system (GNSS) includes, for example, a Global Positioning System (GPS), a Global Orbiting Navigation Satellite System (GLONASS), a future European Galileo system, or the likes. However, the GPS system is more widely used and will be as an example of a GNSS introduced hereinafter.

To meet the requirements of various kinds of existing OFDM-based communication system, a conventional variable-length FFT processor realized with a cached-memory architecture has been proposed. The variable-length FFT processor primarily consists of a control logic (CLU) for deciding a FFT operation and the number/length of data points, an address generator (AG) for generating a address that a catch memory (as a RAM) and a coefficient ROM need, and a butterfly processing element (PE)/stage which performs the complex operation for the data of the RAM and the coefficients output from the ROM based on the address. By utilization of the cached memory interconnecting between the PE and a main memory, the variable-length FFT processor can reduce the number of main memory access in butterfly stages. Such a variable-length FFT processor implemented with a SDF structure can be pre-set to specify a different length (e.g. 1K, 4K or 8K . . . ) of input data points as the FFT size required to proceed, based on the requirement of its specification. Substantially, the input data points would contiguously enter the FFT processor during a signal-receiving process. As long as the input data points are collected to obtain the specific data length, e.g. 1K (1024 bits), a FFT operation would be acted on the respective input data points by the whole FET processor, regardless of how long is the specific length. This might cause a higher hardware complexity and a cost waste due to usage of each of the butterfly stages with numbers of multiplication, addition and register components, even for a shorter length of the data points.

SUMMARY OF INVENTION

To resolve the aforementioned problems, it is therefore a primary objective of the present invention to provide a variable length fast Fourier transform (FFT) system and method for global navigation satellite system (GNSS) signal acquisition and tracking, which is able to enhance the hardware utility and increase throughputs.

The present invention provides a variable length fast Fourier transform (FFT) system and method for different data lengths which includes a plurality of cascaded butterfly stages and at least one divide switch. Each butterfly stage contains at least one of processing elements. In fact, the butterfly stages can be selected from a radix-2, a radix-$2^2$ or radix-$2^3$ butterfly stage. The radix-2 butterfly stage includes a butterfly I processing element. The radix-$2^2$ butterfly stage includes a butterfly I processing element and a butterfly II processing element coupled to the butterfly I processing element. The said radix-$2^3$ butterfly stage includes a butterfly I processing element, a butterfly II processing element coupled to the butterfly I processing element, and a butterfly III processing element coupled to the butterfly II processing element.

Each of the butterfly III processing elements includes a first coefficient handler which consists of a gate control unit, a multiplexer and a multiplier. The gate control unit has two outputs which can be modified by the bypassing signal based on requirements of different data lengths, and the multiplexer is selectively switched by the modified outputs of the gate control unit to determine which one of four different coefficients $$\left(1, -j, \frac{\sqrt{2}}{2}(1-j), \frac{\sqrt{2}}{2}(1+j)\right)$$

is output to the multiplier for adjusting the butterfly III processing element into as an butterfly I processing element, a butterfly II processing element, or a butterfly III processing element, and the multiplier is used to multiply the output coefficient by a data output from the divide switch for a trivial twiddle factor multiplication.

Each of the butterfly II processing elements has a second coefficient handler which consists of a gate control unit, a multiplexer and a multiplier. The gate control of the butterfly II processing element has an output which can be modified by the bypassing signal based on a requirement of data length variance. The multiplexer of the butterfly II processing element is selectively switched by the modified output of the gate control to determine which one of two different coefficients (1, −j) is output to the multiplier for adjusting the butterfly II processing element into as either a butterfly I processing element or a butterfly II processing element. The multiplier of the butterfly II processing element is used to multiply the output coefficient by a data output from the divide switch for a trivial twiddle factor multiplication.

The divide switch interposes in data transmission between two neighboring processing elements located in the same butterfly stage or between two cascaded butterfly stages, and is selectively switched by different levels of a bypassing signal to divide the connection of the adjacent processing elements of the butterfly stage and output either the data output from a processing element previous to the divide switch to the subsequent processing element next to the divide switch for performing a first data length FFT operation, or the data bypassing the processing element previous to the divide switch to directly enter the subsequent processing element next to the divide switch for performing a second data length FFT operation with wherein the second data length shorter than the first data length, independently of the first FFT operation. Thus, the subsequent processing elements divided by the divide switch into an independent radix-2 butterfly stage or an independent radix-$2^2$ butterfly stage. In other embodiment, the subsequent processing elements divided by the divide switch acts as an independent FFT subsystem for performing the second data length FFT operation.

In other aspect, the mode switch generates a bypassing signal and a control signal depended on requirements of different data lengths for an acquisition mode and a tracking mode in a global navigation satellite system (GNSS) receiver. The coefficient multiplexer is switched by different levels of the control signal to output either of two different kinds of twiddle factors for generating different twiddle factor multiplication products.

In the global navigation satellite system (GNSS) signal, the divide switch based on the bypassing signal for the GNSS signal tracking determine the specific processing elements to perform a first FFT operation together with a first data length. The divide switch based on the bypassing signal for the GNSS signal acquisition, divides said specific processing elements into several FFT subsystems to simultaneously perform a second and third FFT operations, independently of each other and the first FFT operation, with different data lengths from the first data length. A memory of the FFT system can be shared in the first, second and third FFT operations. Thus, a post FFT process could share the same memory and by adjusting the same FFT system, different requirement for acquisition mode and tracking mode could be met respectively.

BRIEF DESCRIPTION OF DRAWINGS

Embodiments of the present invention will now be described, by way of example, with reference to the accompanying drawings, in which.

DETAILED DESCRIPTION

Figure 1:
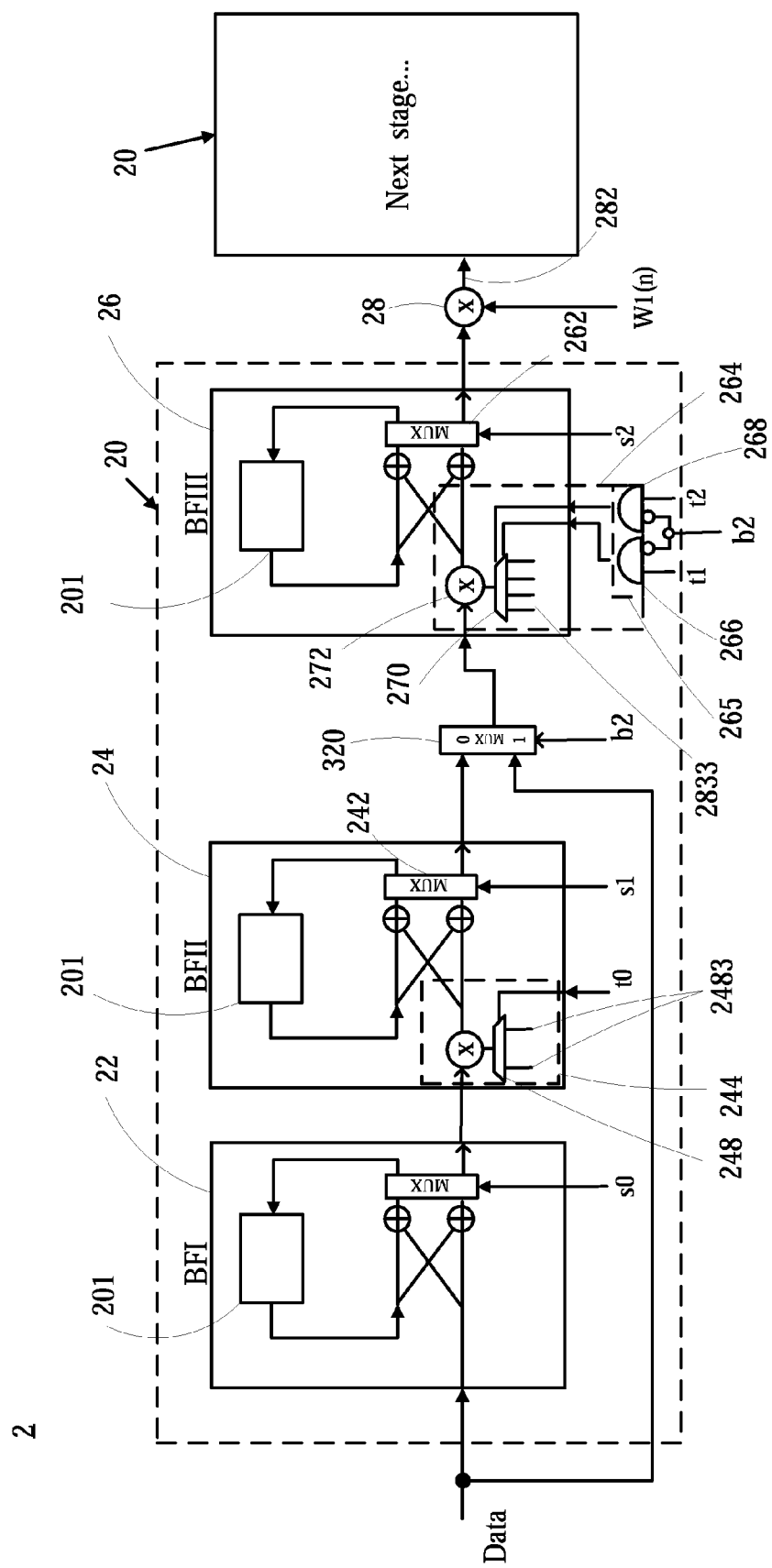
FIG. 1 illustrates a schematic circuit diagram of a variable length FFT system according to a first embodiment of the present invention, including a radix-$2^3$ butterfly stage.

Firstly referring to FIG. 1, a variable length Radix-$2^3$ FFT system 2 employs multiple cascaded Radix-$2^3$ SDF butterfly stages 20 each having great similarity in implementation of hardware and optimized integrators and adders. Multiple multipliers 28 are interleaved among the cascaded Radix-$2^3$ butterfly stages 20, wherein each multiplier 28 is used to multiply the data stream output from the previous butterfly stage 20 by a twiddle factor (like "W1(n)") to generate a multiplication product 282. Then, the multiplication product 282 would be input to the next butterfly stage 20 (as a Radix-$2^3$, a Radix-$2^2$ or a Radix-2 butterfly stage).

Each Radix-$2^3$ butterfly stage 20 is decomposed into a butterfly I processing element (as 'BFI') 22, a butterfly II processing element (as 'BFII') 24 coupled to the butterfly I processing element 22, and a butterfly III processing element (as 'BFIII') 26 coupled to the butterfly II processing element 24 for performing computation divisions of the input data length/points in parallel operation. Based on the decomposition of the decimation-in-frequency (DIF), all of the processing elements 22, 24 and 26 in the multiple cascaded butterfly stages 20 of the variable length Radix-$2^3$ FFT system 2 can be sequentially structured with a feedback register 201 having a different word capacity from N/2, N/4, N/8, . . . to 1.

In this first embodiment, the processing elements 22 and 24 of each of the Radix-$2^3$ butterfly stages 20 are established on the same basis of a conventional Radix-$2^2$ SDF butterfly structure (as containing BFI and BFII). A structure of Radix-$2^3$ SDF could be derived from the following mathematical equation (2):

$$H(k1, k2, k3, n4) = \{\underbrace{[x(n4) + (-1)^{k1}x(n4 + N/2)] + \alpha \cdot \overbrace{[x(n4 + N/4) + (-1)^{k1}x(n4 + 3N/4)]}^{BFI} + \beta \cdot \underbrace{\{[x(n4 + N/8) + (-1)^{k1}x(n4 + 5N/8)] + \alpha \cdot [x(n4 + 3N/8) + (-1)^{k1}x(n4 + 7N/8)]\}}_{BFII}\}}_{BFIII} \quad (2)$$

Wherein $$\alpha = (-j)^{k1+2k2+8k4}, \beta = \left[\frac{\sqrt{2}}{2}(1-j)\right]^{k1+2k2+4k3}$$

are twiddle factors. H(k1, k2, k3, n4) is a time domain function. Please note that the mathematical equation (2) representing the butterfly III processing element (BFII) 26 contains a typical Radix-$2^2$ SDF butterfly structure. Since both of the mathematical equations representing the processing element (BFII and BFIII) 24, 26 are derived from the processing element (BFI) 22, the butterfly III processing elements (BFI, BFII and BFIII) 22, 24 and 26 have the same regularity and operation.

Figure 2A:
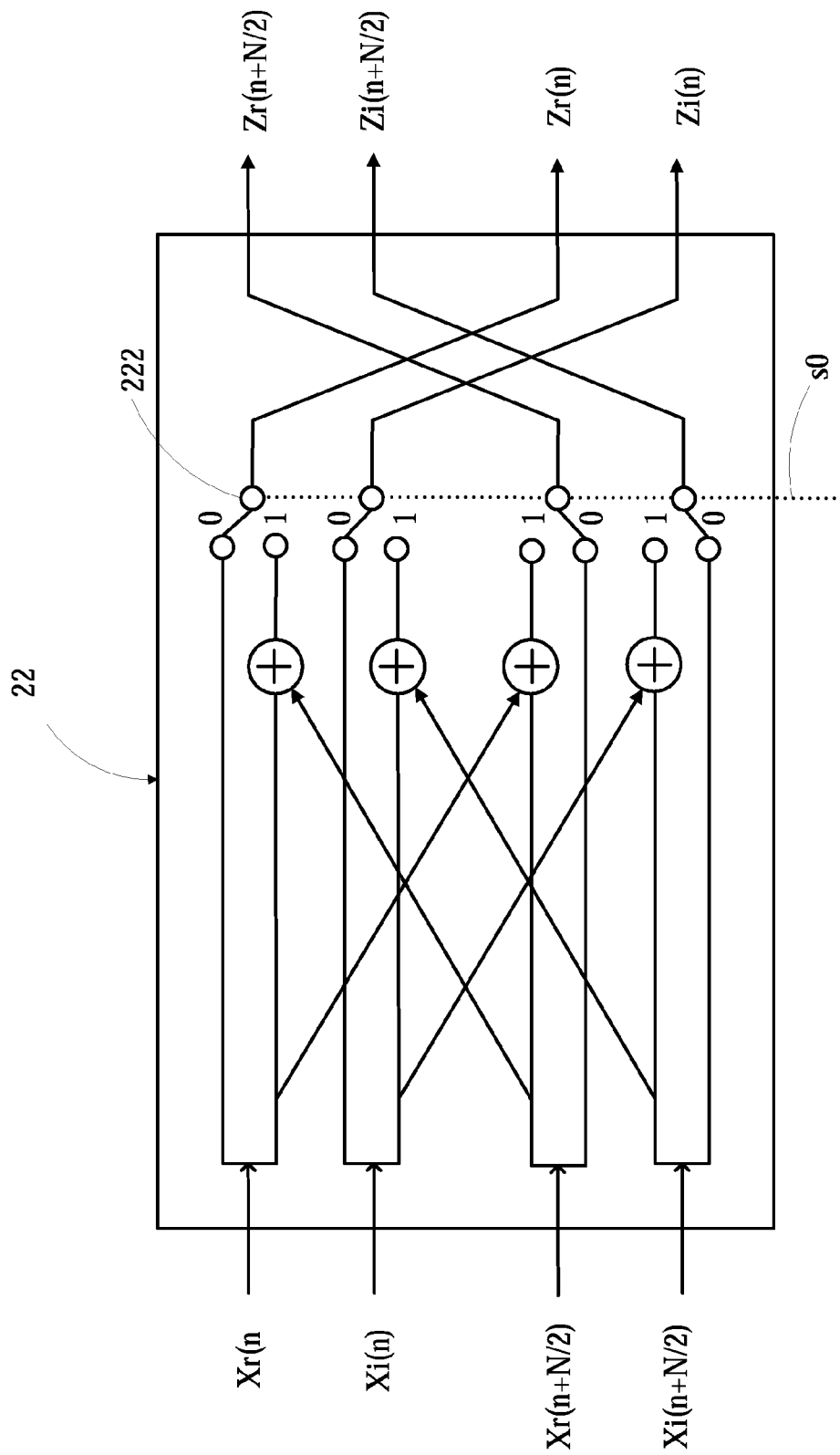
FIG. 2A illustrates a schematic circuit diagram of a first radix-$2^3$ butterfly stage of the variable length FFT system shown in FIG. 1.

Further referring to FIGS. 1 and 2A, a schematic circuit diagram of the butterfly I processing element ('BFI') 22 is introduced. As shown, a multiplex (MUX) 222 is controlled by different levels of a control signal 's0' from a synchronizing counter (not shown), to switch different positions to either directly store the input data into the feedback register 201 or perform a divided-point DFT (Discrete Fourier Transform) operation (as Equation (1)) on the input data.

Figure 2B:
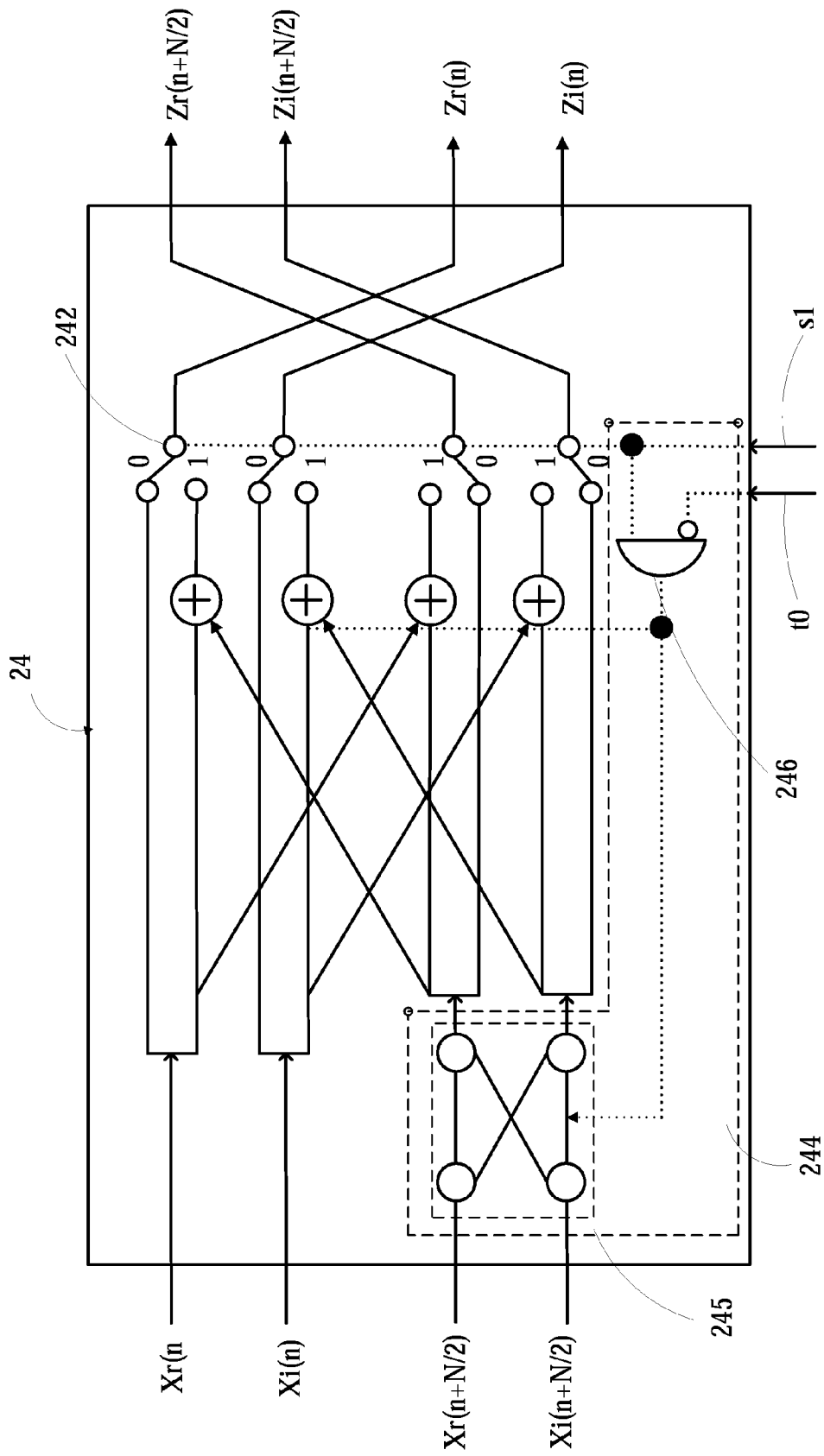
FIG. 2B illustrates a schematic circuit diagram of a second radix-$2^3$ butterfly stage of the variable length FFT system shown in FIG. 1.

Further referring to FIGS. 1 and 2B, a schematic circuit diagram of the butterfly II processing element ('BFII') 24 is introduced. The operation and structure of the butterfly II processing element (BFII) 24 are similar to the butterfly I processing element (BFI) 22 for a hardware implementation. Differently, the butterfly II processing element (BFII) 24 has a coefficient handler 244 which consists of a commutator 245, a multiplexer 249 and a multiplier 248 and a gate control unit as an AND gate 246. The butterfly II processing element (BFII) 24 is controlled by two control signals 't0' and 's1' from the synchronizing counter. The control signal 's1' is applied into an input of the AND gate 246 and to switch a multiplex (MUX) 242 to perform the operation as the BFI 22. The control signal 't0' with a phase different from the control signal 's0' is applied into an inverted input of the AND gate 246, and thereby decides which one of two different coefficients $(1, -j)$ 2483 multiplies the result output from the BFI 22 to obtain a trivial twiddle factor multiplication product via a real-imaginary swapping implemented by the commutator 246 and add/subtract operations.

Figure 2C:
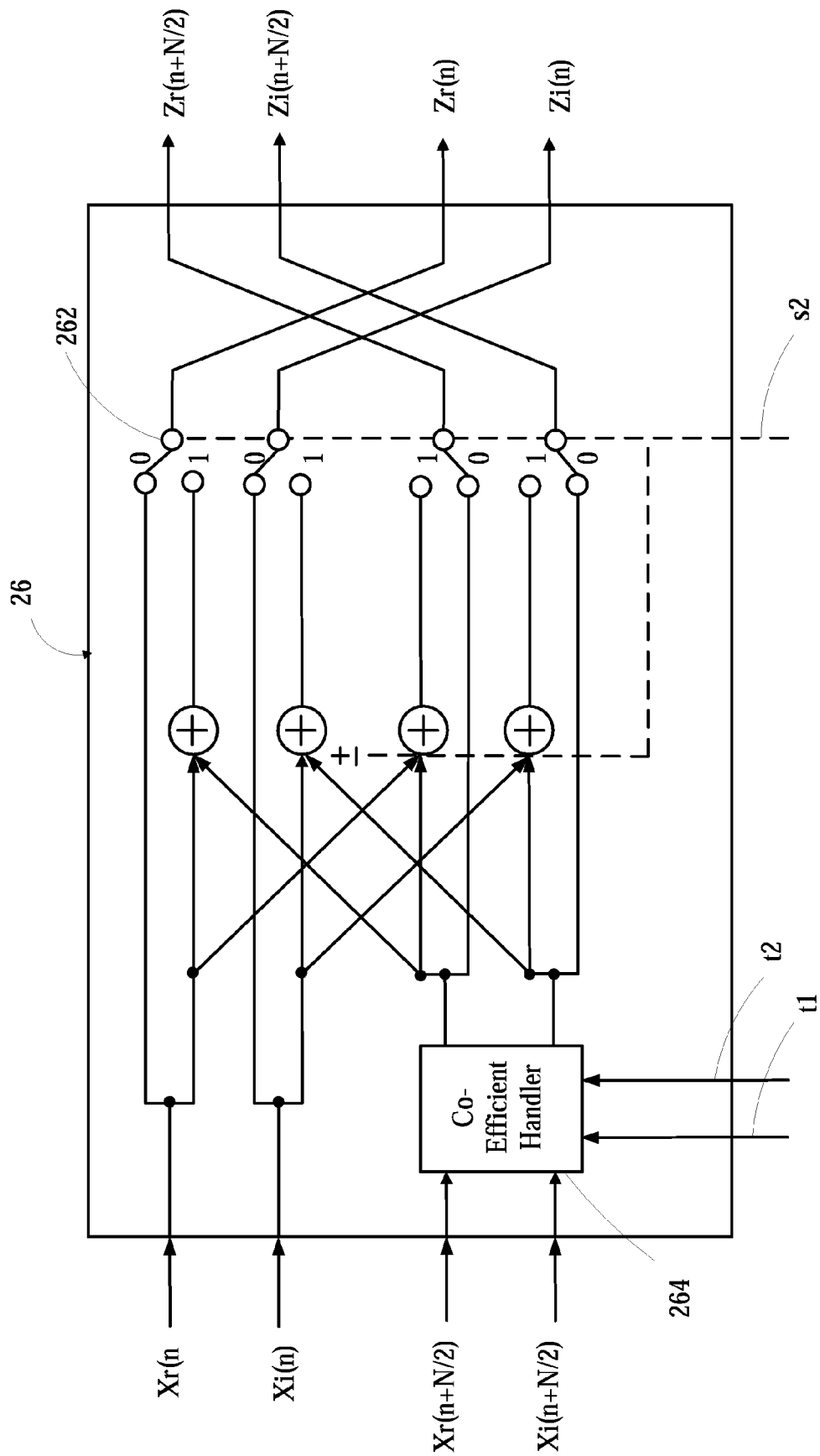
FIG. 2C illustrates a schematic circuit diagram of a third radix-$2^3$ butterfly stage of the variable length FET system shown in FIG. 1.

Please refer to FIGS. 1 and 2C. The structure of the butterfly III processing element (BFIII) 26 should be similar to the processing element (BFI and BFII) 22, 24, except for addition of a third-stage butterfly operation. Differently from the butterfly II processing element (BFII) 24, the butterfly III processing element (BFIII) 26 has a coefficient handler 264 which consists of a gate control unit 265, a 4-to-1 multiplexer 270, and a multiplier 272. The gate control unit 265 has a first and second AND gates 266, 268.

There are two-bit control signals 't1', 't2' in different time sequences are used to decide which one of four different twiddle factor coefficients $$\left(1, -j, \frac{\sqrt{2}}{2}(1-j), \frac{\sqrt{2}}{2}(1+j)\right)$$

2833 to perform a trivial twiddle factor multiplication. The control signal 't1' is applied on an input of the first AND gate 266, and the control signal 't2' is applied on an input of the second AND gate 268. A bypassing signal 'b2' from the bypass control is further applied on both of an inverted input of the first AND gate 266 and an inverted input of the second AND gate 268 for modifying two outputs of the first AND gate 266 and second AND gate 268. For example, when the two-bit control signals 't1', 't2' are set at "00", the coefficient is "1" as performing operation of a butterfly I processing element "BFI". When the two-bit control signals t1, t2 are set at "01", the coefficient is "−j" as performing operation of a butterfly II processing element "BFII". When the two-bit control signals 't1', 't2' are set at either "10" or "11", the coefficient is set at either $$\text{"}\frac{\sqrt{2}}{2}(1-j)\text{" or "}-\frac{\sqrt{2}}{2}(1+j)\text{"}$$

as performing operation of a butterfly III processing element "BFIII". A control signal 's2' is applied to switch a multiplexer 262 and some adders/subtractors. Oppositely a typical Radix-$2^3$ SDF FFT system has to firstly collect a variable data length which is limited in the power of 4 or 8, and then starts to process the input data collected.

To break up the limitation in the power of 4 or 8 of the variable data length, the variable length Radix-$2^3$ FFT system 2 of the present invention shown in FIG. 1 utilizes a 2-to-1 multiplex 320 to act as a divide switch for split of FFT subsystems with different data length FFT operations in at least one butterfly stage 20, based on different levels of a bypassing signal from a bypass control (not shown) and thereby achieves a greater flexibility of variable data length in comparison with the typical Radix-$2^3$ SDF FFT system. By allocation of the multiplex 320 and the bypass control, each Radix-$2^3$ SDF butterfly stage 20 can be split into at least radix-2 or radix-$2^2$ butterfly stage having a specified-shorter data length as the user needs, for example, a split data length=2, 4, 8 . . . . On this way, the N-length Radix-$2^3$FFT system 2 can be divided into multiple FFT subsystems with different data lengths.

In the first preferred embodiment of the present invention shown in FIG. 1, the 2-to-1 multiplex 320 interposes in data transmission between the processing element (BFII and BFIII) 24 and 26 for splits of butterfly stages with different data length FFT operations. The bypass control (not shown) can be implemented in a software or hardware, and in accordance with the requirements of different input data lengths to proceed (for example, a detection of a time when the input data with different lengths enter the variable length FFT system 2) applies the bypass signal 'b2' to switch the multiplex 320 to different positions (e.g. 1 or 0) to permit pass of either the data resulted from the processing element (BFII) 24 or the input data bypassing the processing elements (BFI and BFII) 22 and 24 to directly enter the processing element (BFIII) 26.

Simultaneously, the polarities of two outputs from both the first and second AND gates 266, 268 are modified by the bypass signal 'b2' so that the multiplexer 270 is switched to determine which one of four different twiddle factor coefficients $$\left(1, -j, \frac{\sqrt{2}}{2}(1-j), \frac{\sqrt{2}}{2}(1+j)\right)$$

2833 is output to the multiplier 272 for a trivial twiddle factor multiplication with the data output from the multiplex 320.

In an exemplar, if a FFT operation with 8-point data length is needed to be performed in the variable length Radix-$2^3$ FET system 2, the bypass signal 'b2' is set at a specific level to let the input data bypass the processing element (BFI and BFII) 22, 24 to enter the processing element (BFIII) 26, and to modify the two outputs of the first and second AND gates 266, 268 so that the processing element (BFIII) 26 only uses a twiddle factor coefficient "1" to act as a pure radix-2 butterfly stage which functions as a radix-2 FFT system. This would bring less stage numbers, less complex multipliers and an operating-time saving because a variable data length can be subdivisible upon the demands on different collected data lengths. For hardware cost, utilization and throughput concern, a FFT system with a split-radix SDF structure will be more preferred.

In another exemplar, if a FFT operation with 8-point data length is needed to be performed in the variable length Radix-$2^3$FFT system 2, the bypassing signal 'b2' is changed at different level by the bypass control to switch the multiplex 320 for permitting the data resulted from the processing element (BFII) 24 to enter the processing element (BFIII) 26. The processing element (BFIII) 26 use the four twiddle coefficients $$\left(1, -j, \frac{\sqrt{2}}{2}(1-j), \frac{\sqrt{2}}{2}(1+j)\right)$$

to operate.

Utilization of the multiplex 320, the bypass control and the gate control unit 265, either each radix-$2^3$ or radix-$2^2$ butterfly stage 20 can be selectively split into a smaller SDF butterfly stage (as a radix-2 butterfly) which operates with a shorter data length of down to the power of 2. In contrast, the conventional radix-$2^3$ or radix $2^2$ FFT system with a limited data length (e.g. the power of 4 or 8) can not be divided into different-radix subsystems for FFT operations of different input data lengths.

Optimally, the length of input data of the variable length FFT system 2 can be the power of 8, for examples, 8, 64, 128, or 256, . . . and so on, wherein each basic processing element (PE) of the variable length FFT system 2 is constructed on basis of at least one Radix-$2^3$ butterfly structure. By splitting any one of the Radix-$2^3$ butterfly structure into different-radix butterfly stages, length variance of input data length of the variable length FFT system 2 will become greater flexible than the prior art as above mentioned.

Figure 3:
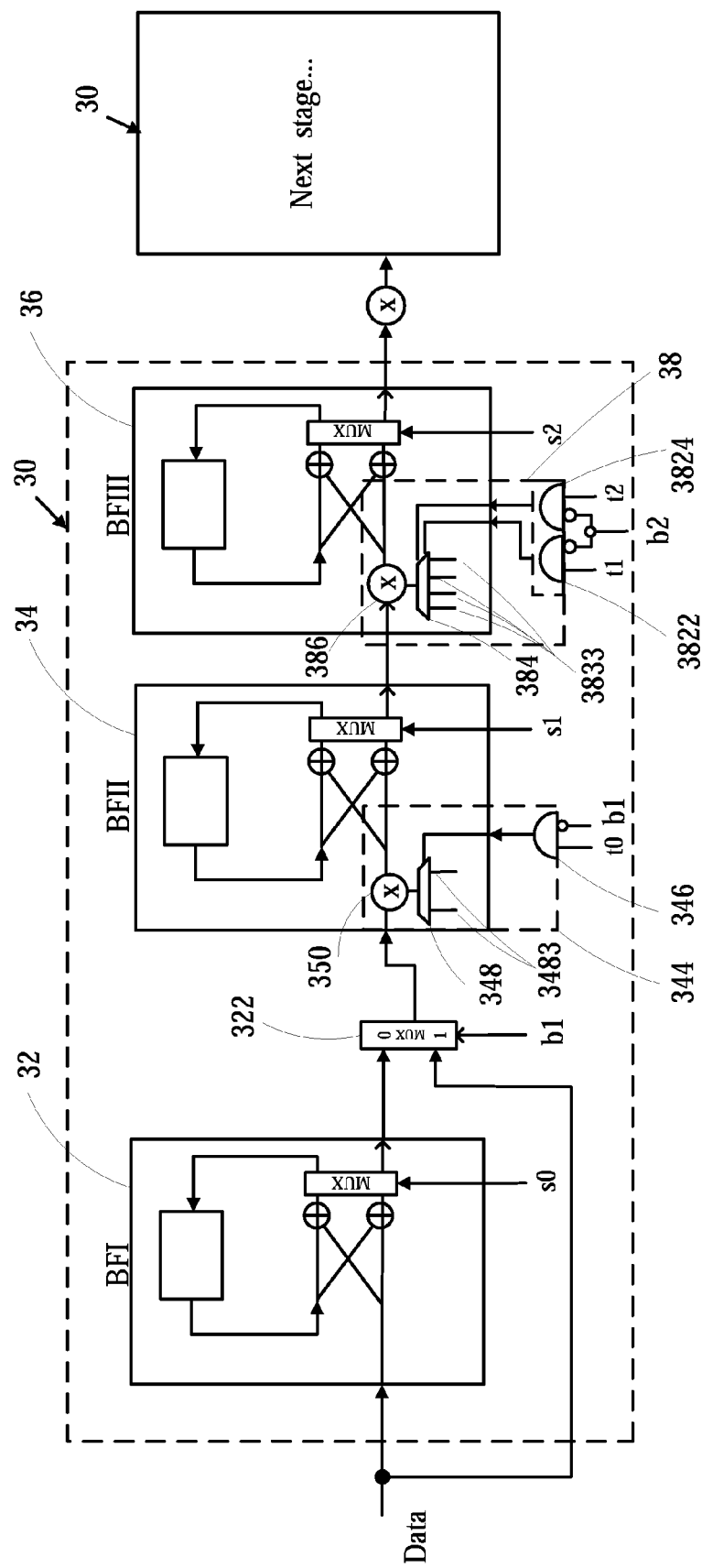
FIG. 3 illustrates a schematic circuit diagram of a variable length FFT system according to a second embodiment of the present invention, including another radix-$2^3$ butterfly stage.

Further referring to FIG. 3, a variable length Radix-$2^3$ FFT system 3 according to a second embodiment of the present invention has multiple cascaded Radix-$2^3$ SDF butterfly stages 30 wherein each Radix-$2^3$ SDF butterfly stage 30 is decomposed into a butterfly I processing element (as 'BFI') 32, a butterfly II processing element (as 'BFII') 34 coupled to the butterfly I processing element 32, and a butterfly III processing element (as 'BFIII') 36 coupled to the butterfly II processing element 34 for performing computation divisions in parallel operation.

Differently from the first embodiment, a 2-to-1 multiplex 322 according to the second embodiment interposes in data transmission between the processing elements (BFI and BFII) 32, 34 for performing different data length FFT operations. A bypass control (not shown) generates two bypassing signals 'b1', 'b2' in different time sequences based on a detection of a time when the input data with different lengths enter the variable length Radix-$2^3$ FFT system 3. The bypassing signals 'b1' is applied to switch the multiplex 322 to different positions (e.g. 1 or 0) which permit pass through of either the input data resulted from the processing element (BFI) 32 or the input data bypassing the processing element (BFI) 32 to directly enter the processing element (BFII) 34. In other case, the location of the 2-to-1 multiplex 322 can be changed to interpose in data transmission between the two cascaded butterfly stages 30 for performing different data length FFT operations.

The butterfly II processing element (BFII) 34 has a coefficient handler 344 which consists of a first gate control 346, and a 2-to-1 multiplexer 348, and a multiplier 350. The first gate control 346 is as an AND gate wherein a control signal 't0' is applied on an input of the AND gate 346, and the bypass signal b1 of the bypass control is further applied on an inverted input of the AND gate 346. Based on the polarity variances of an output signals from the AND gate 346, the multiplex (MUX) 346 is switched to determine which one of two input twiddle coefficients (1, −j) is output to the multiplier 350 for generating a trivial twiddle factor multiplication with the input data from the multiplex 322.

The butterfly III processing element (BFIII) 36 has a coefficient handler 38 which consists of a second gate control 382, and a 4-to-1 multiplexer 384, and a multiplier 386. The second gate control 382 has a first and second AND gates 3822, 3824 wherein a control signal 't1' is applied on an input of the first AND gate 3822, and another control signal 't2' is applied on an input of the second AND gate 3824. The bypassing signal 'b2' of the bypass control is further applied on both of an inverted input of the first AND gate 3822 and an inverted input of the second AND gate 3824 for modifying two outputs of the first and second AND gate 3822, 3824. Based on the modification of the two outputs from both the first and second AND gates 3822, 3824, the 4-to-1 multiplex (MUX) 384 is switched to determine which one of four input twiddle coefficients $$\left(1, -j, \frac{\sqrt{2}}{2}(1-j), \frac{\sqrt{2}}{2}(1+j)\right)$$

is output to the multiplier 386 for generating a trivial twiddle factor multiplication.

By controls of different levels of the bypassing signals 'b1', 'b2' output from the bypass control, the control signal 't0' for the processing element (BFII) 34 and the control signals 't1', 't2' for the processing element (BFIII) 36 could be modified to let the input data bypass the processing element (BFI) 32, and then the remaining butterfly structures (as the processing elements (BFII and BFIII) 34, 36) becomes a radix-2 butterfly stage (containing BFI and BFII) which functions as a radix-$2^2$ FFT subsystem.

In an exemplar, as soon as a FFT operation with 8-point data length is performed in Radix-$2^3$ SDF butterfly stage 30 of the variable length Radix-$2^3$ FFT system 3, the bypassing signal 'b1' can be set at a specific level by the bypass control to switch the multiplex 322 for permitting the data resulted from the processing element (BFI) 32 to enter the processing element (BFII) 34. By inventing the bypassing signal 'b1', the polarity of the output of the AND gate 346 of the processing element (BFII) 34 is changed to switch the multiplexer 348 with sequential usages of two twiddle coefficients (1, −j). The processing element (BFII) 34 performs a butterfly II operation as shown in FIG. 2B.

In the next cycle, the bypassing signal 'b2' can be set at a specific level by the bypass control to modify two outputs of the first and second AND gates 3822, 3824 of the processing element (BFIII) 36. Thereby the 4-to-1 multiplexer 384 is switched with sequential usages of different twiddle coefficients $$\left(1, -j, \frac{\sqrt{2}}{2}(1-j), \frac{\sqrt{2}}{2}(1+j)\right)$$

as performing a BFII operation as shown in FIG. 2C.

Oppositely, as soon as a FFT operation with 4-point data length is performed in the variable length Radix-$2^3$ FFT system 3, the bypassing signal 'b1' can be set at different level by the bypass control to switch the multiplex 322 in turn for permitting the input data bypassing the processing element (BFI) 32 to directly enter the processing element (BFII) 34. By inverting the bypass signal 'b1', the multiplexer 348 is switched with only usage of one twiddle coefficient '1'. Thus, the processing element (BFII) 34 performs a BFI operation as shown in FIG. 2A.

In the next cycle, the bypassing signal 'b2' is set at a specific level by the bypass control to modify the two outputs of the first and second AND gates 3822, 3824 of the processing element (BFIII) 36 so that the multiplexer 384 is switched with only usages of two twiddle coefficient '1' or '−j'. Thus the processing element (BFIII) 36 performs a BFII operation shown in FIG. 2B.

By building different split points in such a variable length Radix-$2^3$ FFT system as shown in FIGS. 2 and 3, a basic butterfly stage of the variable length Radix-$2^3$ FFT system 2 or 3 can be selectively performed for a Radix-$2^3$, Radix-$2^2$ or even Radix-2 length butterfly stage.

In other applications, the variable length FFT system can be built up by mixing a radix-$2^3$ and radix-$2^2$ or a radix-2 butterfly stages to achieve any data length that is needed. When various FFT systems with different data lengths are needed, an adjustable minimum data length butterfly stage can be any one radix-2 factor. For example, a 64-point FFT system can be split to be used as 2/4/8/16/32-point FFT subsystem, even having a radix-$2^3$ structure. In conventional SDF FFT structure, all butterfly stages must be a pure radix-2 butterfly stage if all length factors are needed. Therefore, the complex multiplier number can be minimized with maximum flexibility.

Figure 4:
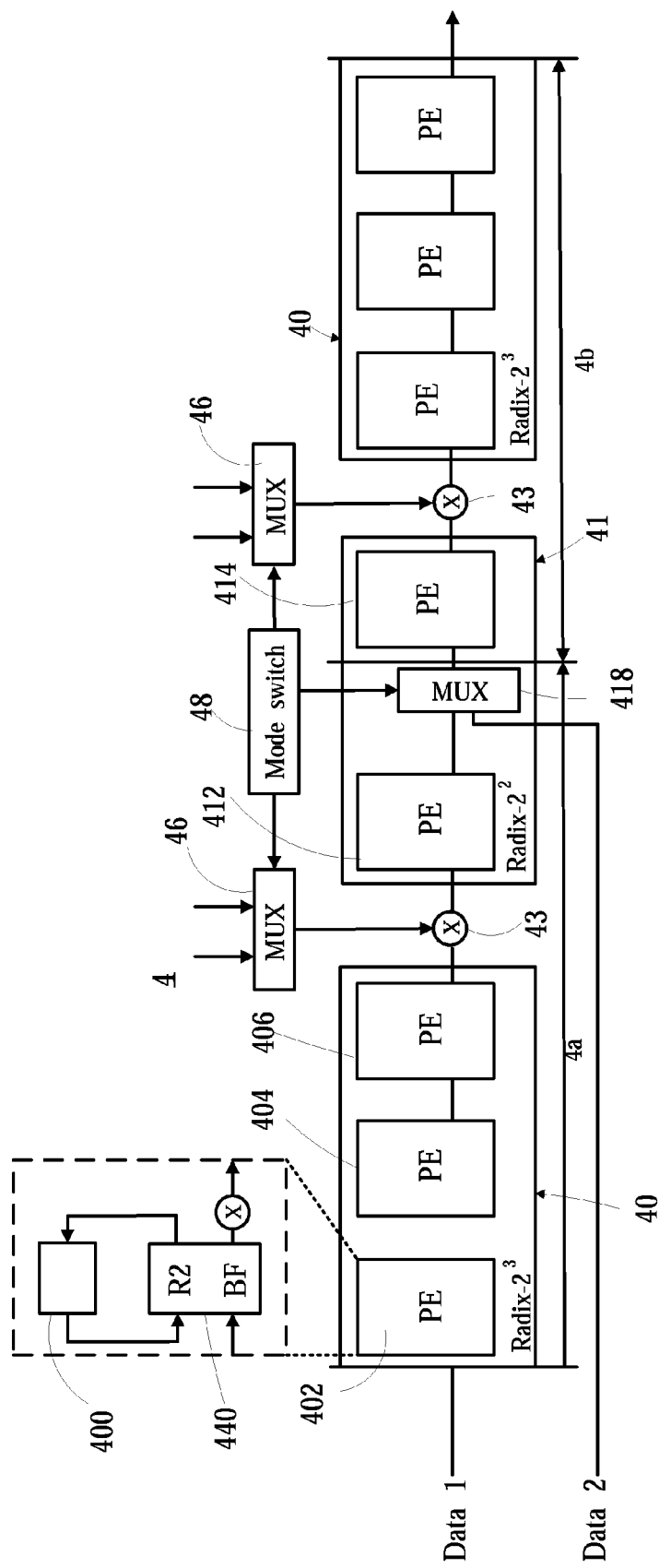
FIG. 4 illustrates a schematic circuit diagram of a variable length 256-point FFT system with usage of a plurality of SDF butterfly stages according to a third embodiment of the present invention.

Further referring to FIG. 4, a variable length FFT system 4 according to a third embodiment of the present invention has multiple cascaded Radix-$2^3$ and Radix-$2^2$ butterfly stages 40, 41. Each of Radix-$2^3$ butterfly stages 40 (like a typical Radix-$2^3$ SDF butterfly structure) is decomposed into a plurality of processing elements (PE) including, for example a butterfly I processing element (BFI) 402, a butterfly II processing element (BFII) 404 and a butterfly III processing element (BFIII) 406. At least one of the Radix-$2^2$ butterfly stages 41 is decomposed into a plurality of processing elements (PE) including a butterfly I processing element (BFI) 412 and a butterfly II processing element (BFII) 414. A 2-to-1 multiplex (MUX) 418 interposes in data transmission between the adjacent processing elements (BFI and BFII) 412 and 414 to act as a divide switch for split of FFT subsystems to perform different data length FFT operations. In this third embodiment, as shown in FIG. 4, each processing element of the variable length FT system 4 has a SDF (Single-Path Delay Feedback) structure with a delay register 400, a radix-2 butterfly operation 440 and a MUX.

Multiple coefficient multipliers 43 are interleaved among the cascaded Radix-$2^3$ and Radix-$2^2$ butterfly stages 40, 41. Each coefficient multiplier 43 is used to multiply the data stream output from the previous butterfly stage 40 or 41 by a variable twiddle factor input to generate a multiplication product for input to the next butterfly stage 40 or 41. The variable twiddle factor input is generated from a corresponding 2-to-1 coefficient multiplex (MUX) 46 which is selectively switched by different levels of a control signal from a mode switch 48 to either of two kinds of twiddle factors based on the requirement of which one of two different FFT operation modes, for example, an acquisition mode or a tracking mode in a global navigation satellite system (GNSS) receiver upon data receiving. At the same time when the mode switch 48 generates a control signal to switch the multiplexes 46, the multiplex 418 is controlled by different levels of a bypassing signal from the mode switch 48 to switch different positions to collect a N-length data from the prima Radix-$2^3$ butterfly stages 40, or collect a n1-length data 1 (n1<N) from the prima Radix-$2^3$ butterfly stages 40 to the processing element (BFI) 412 and/or collect a n2-length data 2 (n2<N) from the processing element (BFII) 414 to the other following butterfly stages 40 or 41, with bypassing the processing element (BFI) 412 and the prima Radix-$2^3$ butterfly stages 40. Since the lengths n1, n2 of the data 1 and 2 can be the same or different, the different data length FFT operations can be implemented simultaneously in the same FFT system 4 which is split by the multiplex 418 into several FFT subsystems. Thus, a hardware utility can be enhanced after FFT length change.

In an exemplar as shown in FIG. 4, when a 16-point FFT operation needed is performed on a 256-point FFT system (as the numeral reference 4), the multiplex 418 can split the 256-point FFT system 4 into a first and second parts as two independent FFT subsystems 4a and 4b. Actually, only the second part 4b is needed for the 16-point FFT operation, which is the latter half butterfly stages arranged behind the multiplex 418. However, the FFT subsystem 4a, which is the rest butterfly stages arranged in front of the multiplex 418, still could perform a different-length FFT operation, simultaneously. Here there is a proposed method capable of enhancing the hardware utility and FFT throughputs of the 256-point FFT system 4. The FFT subsystem 4a can perform another 16-point FFT operation if the feedback memory address controls on radix-2 butterfly stages (as PEs) located in the FFT subsystem 4a are modified. For example, the delay register 400 of the processing element 402 contains 128 registers but only 8 points are used among it, and the delay register 400 of the processing element 404 contains 64 registers but only 4 points are used among it, and so on.

Figure 5:
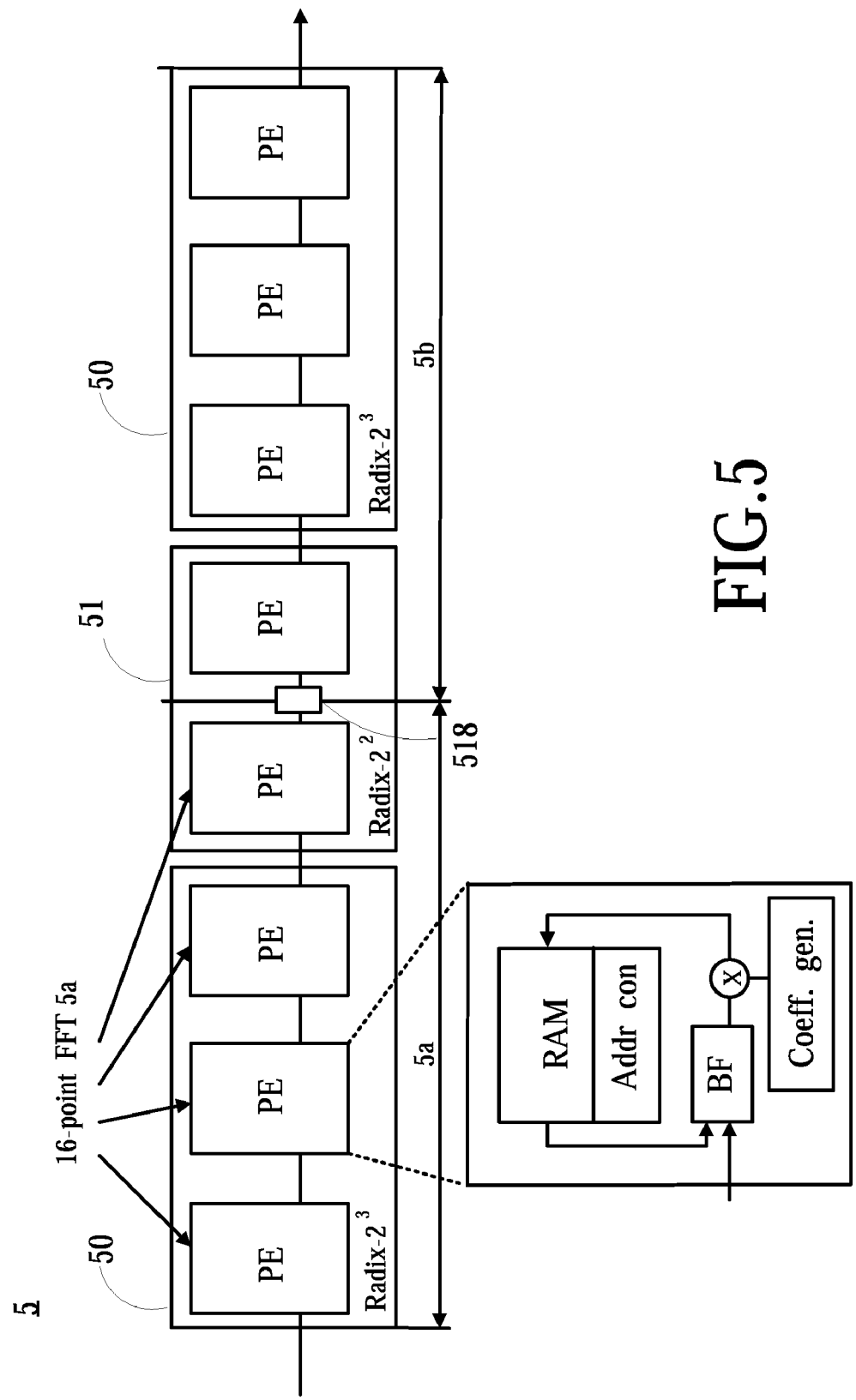
FIG. 5 illustrates a schematic circuit diagram of another variable length 256-point FFT system with usage of at least one memory-based butterfly stage according to a fourth embodiment of the present invention.

Further referring to FIG. 5, a variable length FFT system 5 according to a fourth embodiment of the present invention has multiple cascaded Radix-$2^3$ and Radix-$2^2$ butterfly stages 50, 51 which are similar to the third embodiment. When a 16-point FET operation is performed on a 256-point FFT system (as the numeral reference 5), the multiplex 518 can split the 256-point FFT system 5 into two parts as two independent FFT subsystems 5a, 5b. The only difference is that each of four radix-2 butterfly processing elements of the FFT subsystem 5a of the fourth embodiment can be switched to a memory-based FFT mode as shown in FIG. 5. That is, a structure of each processing element (PE) in one butterfly stage can become a memory-based FFT system. It contains an address controller for the embedded SRAM and a more complex coefficient handler and it could perform a FFT operation on it own. Thereby, four 16-point FFT operations can be performed on the FFT subsystem 5a. The throughputs of the variable length FFT system 5 are greatly increased than the third embodiment.

In other embodiments, the split of FFT system according to the present invention can be selectively configured into several different structures depended on system requirement. For example, a 256-point FFT system should be selectively configured to be split into a 8-point FFT subsystem and a 32-point FFT subsystem both with SDF structures, or into a 32-point FFT in SDF structure and a 128-point FFT in memory-based structure or even in a MDC (Multi-path Commutator) structure.

For application of a GPS receiving systems, the same variable length FFT system with usage of the same memory according to the present invention can be flexibly adjusted for different correlations of the two different GPS signal modes including an acquisition mode and a tracking mode. By the variable length FFT system of the present invention, a high speed code phase and Doppler bin scan can be achieved in the acquisition mode. And, an analysis of a correlation result is acquired so as to achieve a GPS signal during seeking a specific number of satellites sufficient to precisely position a GPS receiver. The correlation result can be achieved from an integration of a multiplication product of each corresponding hypothesis (like a code, code phase or a Doppler phase shift between the GPS receiver and satellite) and the sampled GPS signal for a specific period.

In the tracking mode after the GPS receiver is positioned, by a FFT operation of the variable length FFT system of the present invention, the initialization of those satellites is contiguously tracked, and a Doppler spectrum analysis of a time domain correlation result can be performed, and thereby vary the correlation to compensate for a Doppler shift error. Also, the FFT operation can assist in continuously tracking information contained in a higher Doppler frequency of a local carrier signal.

In application for a GPS system, the variable length of the variable length FFT system according to the present invention can be flexibly configured in a software or hardware but the over-all throughput thereof is maintained or even greatly increased. Compared with a conventional FFT structure, the variable-length FFT system proposed above by the present invention takes care of hardware efficiency, hardware utility and performance enhancement at the same time.

Figure 6:
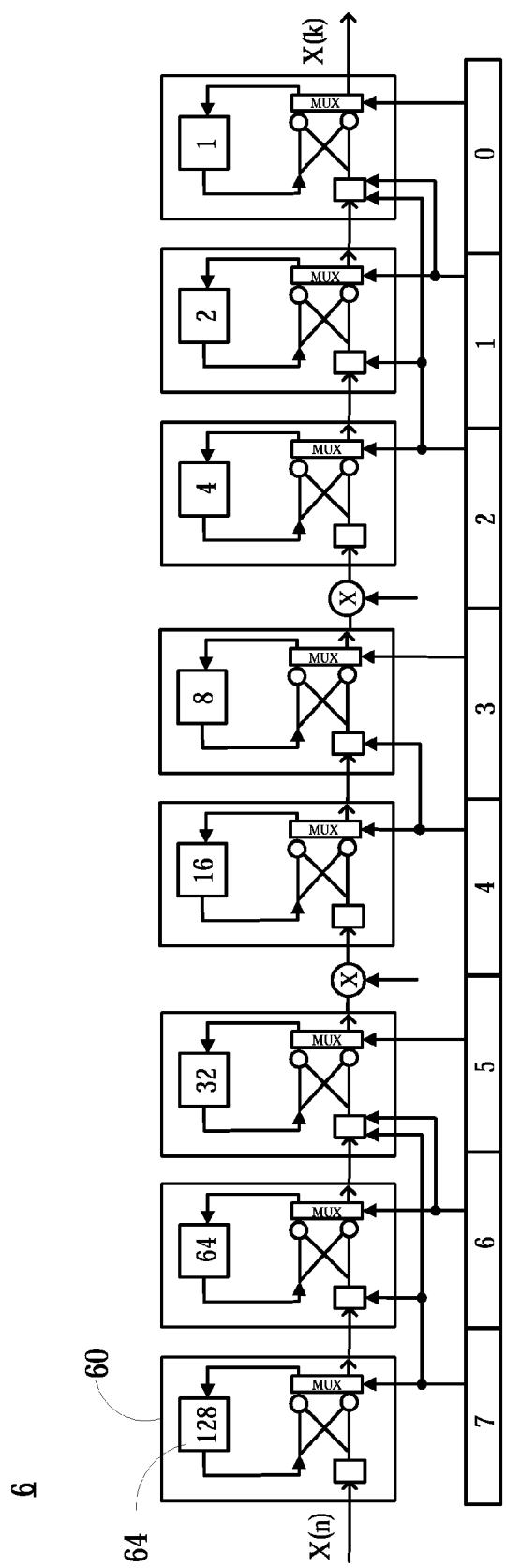
FIG. 6 illustrates a schematic circuit diagram of a variable length 256-point FFT system according to a fifth embodiment of the present invention.
Figure 7A:
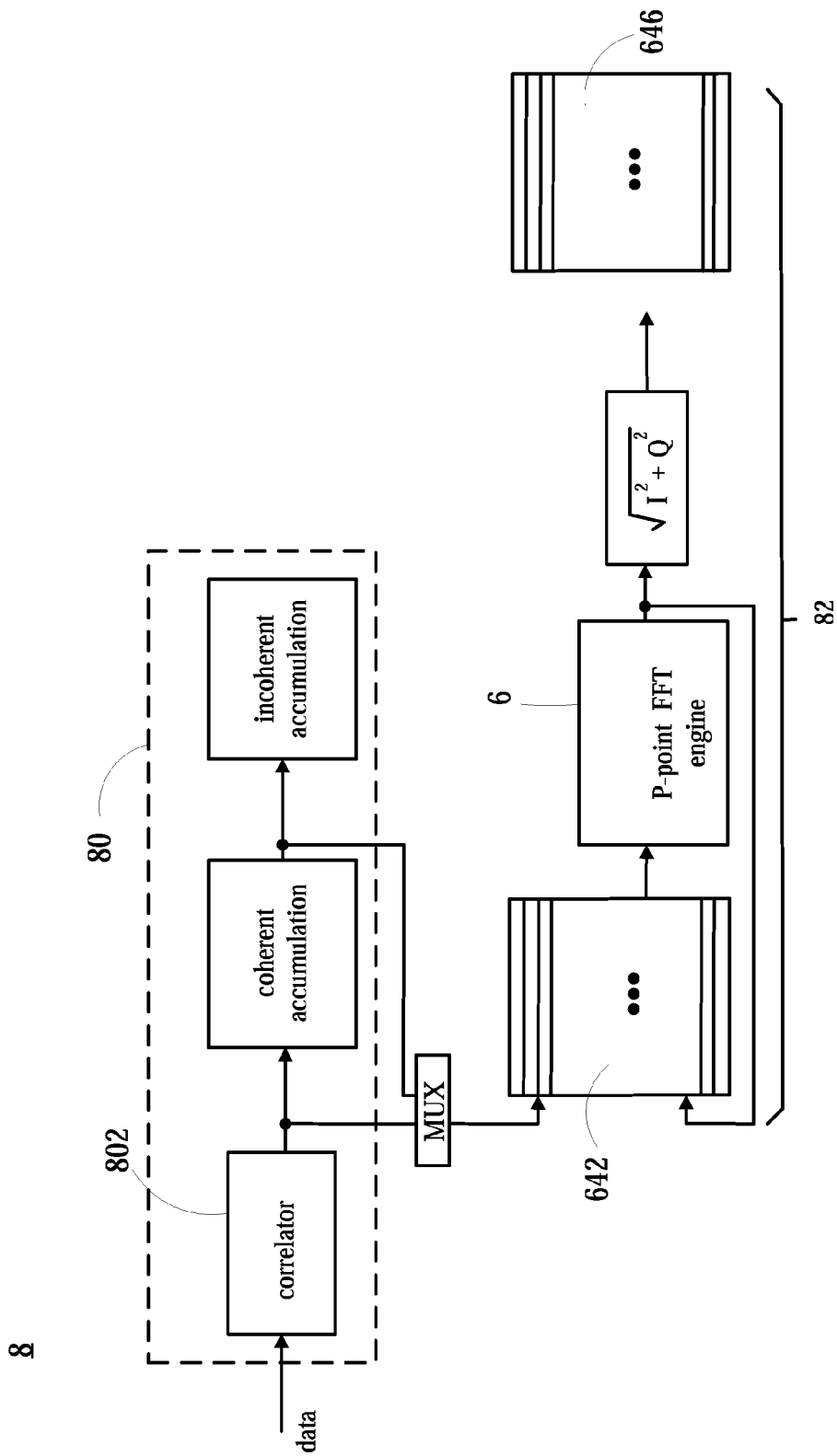
FIG. 7A illustrates a schematic architecture diagram of a GPS system with usage of the variable length 256-point FFT system as shown in FIG. 6 for a tracking mode.
Figure 7B:
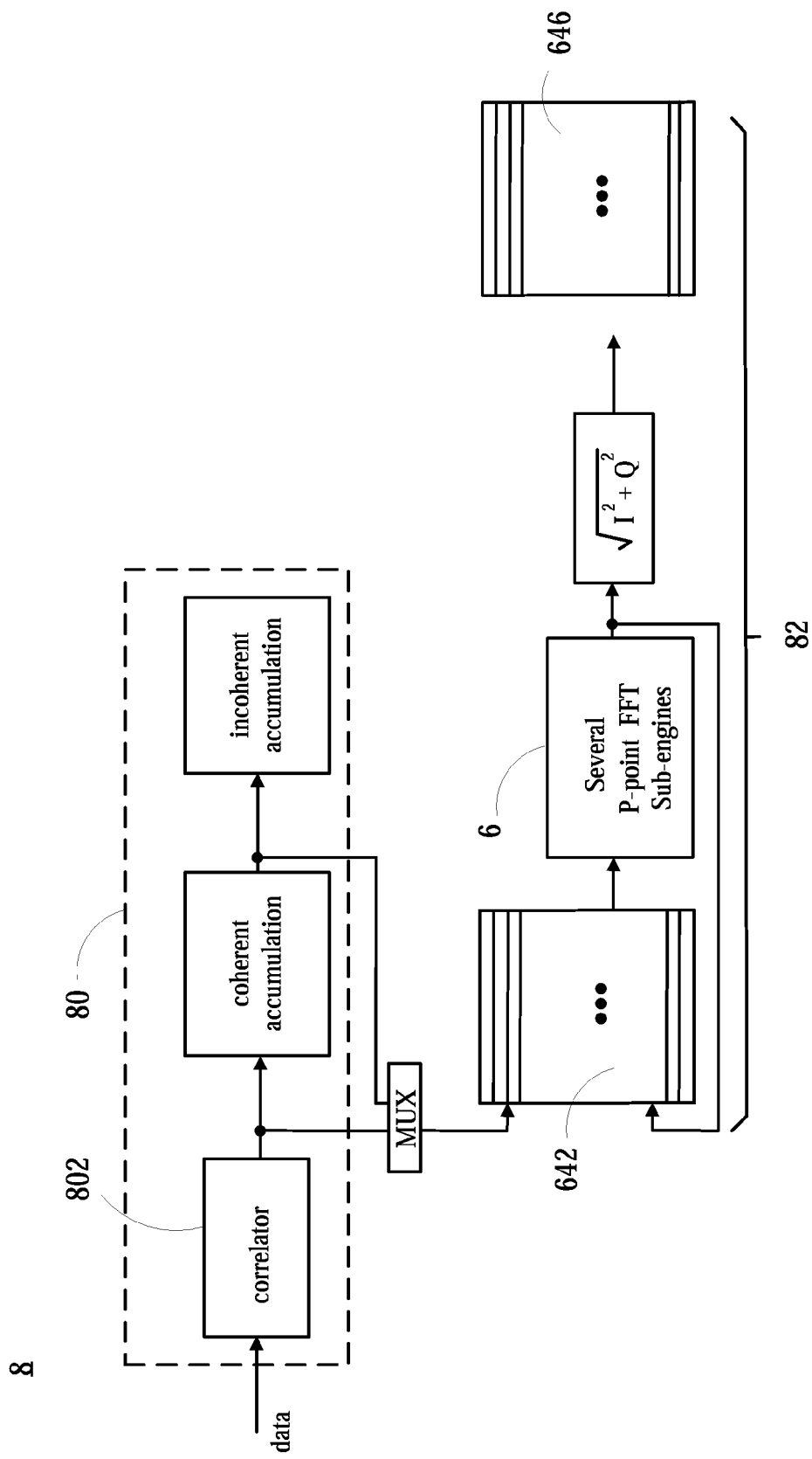
FIG. 7B illustrates a schematic architecture diagram of the GPS system as shown in FIG. 6, which with the variable length 256-point FFT system is divided into several FFT subsystems for an acquisition mode.

According to a fifth embodiment of the present invention, a variable length FFT system 6 applied for a GPS receiving system is shown in FIGS. 6, 7A and 7B. In a post-FFT process of the GPS receiving system, both of an acquisition mode and a tracking mode often respectively need FFT system to perform different FFT operations.

When a GPS signal is tracked in the tracking mode, the approximate code phase is obtained and the center Doppler drifting is relatively small. A post correlation FFT operation could be used to extract the residual Doppler frequency. In the tracking mode, the requirement of the frequency resolution is very high, and the number of code phase and Doppler combination, as called a "hypothesis", is not large. In an exemplar as shown in FIGS. 6 and 7A, during the tracking mode, the 256-point FFT system 6 with timing multiplexing for 64 hypotheses is proposed. The 256-point FFT pipeline system 6 with a variable data length has a SDF structure constructed of 8 cascaded butterfly stages 60 with data memories of feedback registers 64 from 128 to 1 as shown in FIG. 6.

Please further refer to FIG. 7A, a schematic block diagram of a GPS receiving system 8 with usage of the variable length FFT system 6 in a tracking mode is proposed. In this scheme a memory of the FFT system 6 includes two memories to use, one of which is a first memory 642 has 'H' (e.g. H=64) hypotheses or levels, and each hypothesis has 'P' (e.g. P=256) points, and each point has 'N' bits wherein 'N/2' bit for a real part of the data and the other 'N/2' bit for a image part of the data, and the other of which is a second memory 646 that consists 64 hypothesis or levels and each hypothesis has 'P' (e.g. P=256) points and each point has 'N/2' bits for a real part. Thus, a computing time of the FFT system 6 in the tracking mode can be achieved by the following equation (3):

$$64 \text{ hypotheses} * 256 \text{ point} * Tf = 16384 * Tf \quad (3)$$

wherein 'Tf' is a clock period of the FFT system 6.

The first memory 642 is used to store all the 64 hypotheses for performing an oncoming FFT operation in FFT system 6 and the data type of the hypotheses is a complex value. In fact, each sampled GPS signal has an in-phase components as the complex value which likes a 'I+jQ' wherein 'I' a real part and 'Q' is imaginary part for representing the phase and magnitude. A data input of the first memory 642 is a coherent integration result from a correlator 802 for transferring a data relative to GPS signal received from a time domain correlation area 80 to a frequency domain correlation area 82. After calculating the magnitude of the first memory 642, an incoherent integration result is accumulated in the second memory 646 for incoherent integration accumulation. With this scheme, a code phase and Doppler frequency of the tracked GPS signal could be tracked precisely.

Please further refer to FIG. 7B, another schematic block diagram of the GPS receiving system 8 with usage of the variable length FFT system 6 in a acquisition mode is proposed. When the GPS signal without any data aiding is acquired, the code phase and Doppler frequency are unknowns. Quick code phase and Doppler frequency scan search is needed, especially for weak signals In the acquisition mode, the 256-point FFT system 6 and usage of the first and second memory 642, 646 need to be adjusted. The reason is that all code phase need to be searched so that there are 2046 hypotheses to be needed. Since the Doppler frequency could be roughly searched firstly, a 16-point FFT operation is enough. By the divide switches 418, 518 and the mode switch 48 shown in FIG. 4 or 5, the 256-point FFT system 6 could be divided into several or two 'p'-point (e.g. p=16) FFT subsystems with a SDF and/or a memory-based structure. The SDF and/or memory-based structure of the two divided 16-point FFT subsystems can operate simultaneously to keep enough throughputs and enhance the hardware utilization. The two divided 16-point FFT subsystems are time multiplexed for 1023 hypotheses per each one. Therefore, the first memory 642 is used as 'h' (e.g. h=2046) hypotheses or levels, and each hypotheses has 'p' (e.g. p=16) points, and each point has 'n' bits memory for data type of a complex value. And the second memory 646 is transformed as 2046 hypotheses also. The data bit number in the first memory 642 is halved since for low SNR signal, fewer quantization bits do not greatly hurt output SNR signal, and its memory in the tracking mode could be shared in this way.

Based on the aforementioned, in the tracking and acquisition mode, the same memory (since H*P*N=h*p*n) could be shared by different configurations. In the acquisition mode, a computing time of the two divided 16-point FFT subsystems in the tracking mode can be achieved by the following equation (4):

$$2046 \text{ hypotheses} * 16 \text{ point} * Tf/2 = 16368 * Tf \quad (4)$$

Wherein the computing time is divided by the two 16-point FFT subsystems. Thus, the throughput keeps the same in the different modes.

The computing power should focus on different aspects during acquisition mode and tracking mode. Limited number of hypothesis and high frequency resolution is needed in the tracking mode and quick code phase scan and rough Doppler search is needed in the acquisition mode.

Figure 8:
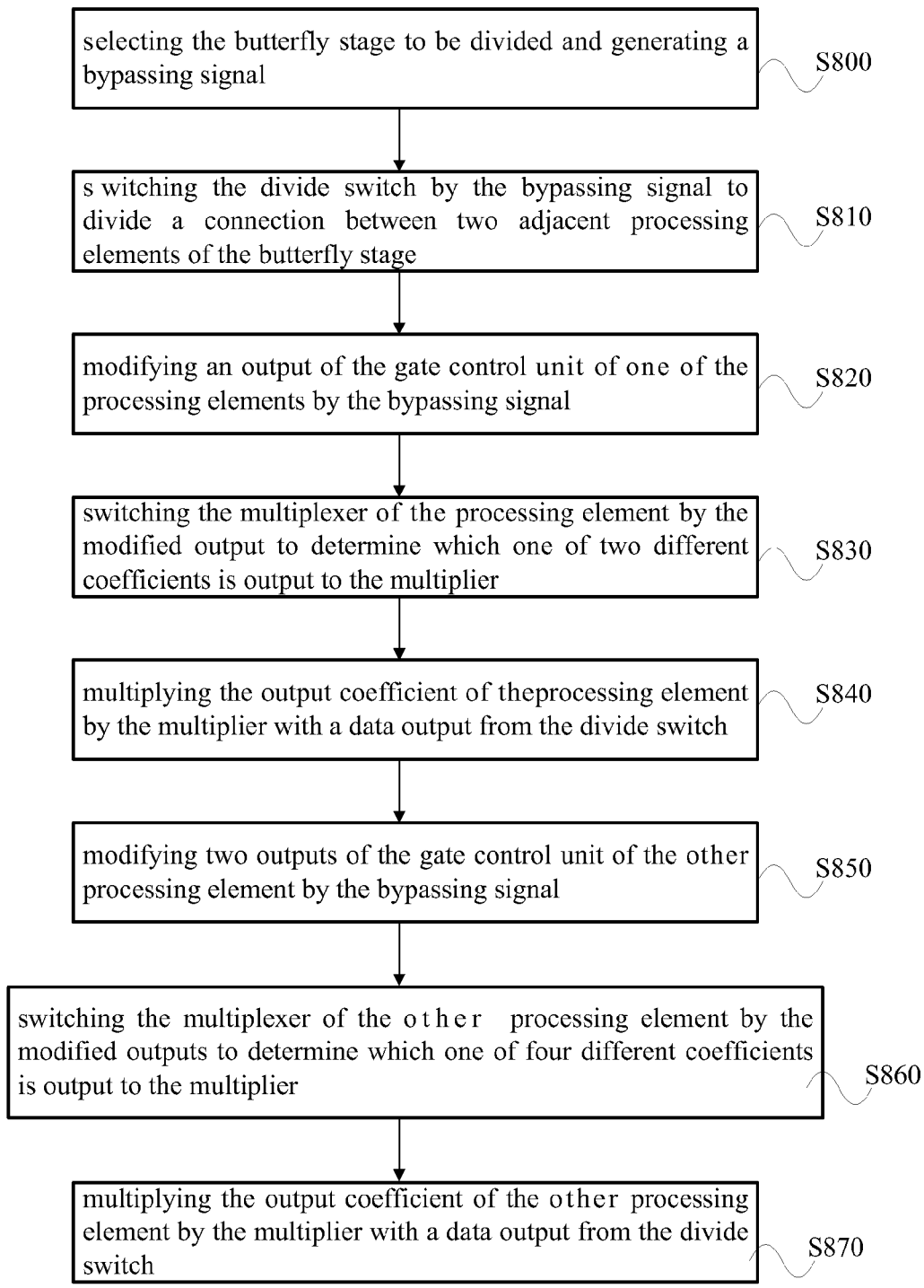
FIG. 8 illustrates a flow chart of a method for performing the variable length FFT system as shown in FIG. 3 according to a preferred embodiment of the present invention

Beside, as shown in FIG. 8, the present invention provides a method for performing a variable length FFT system which includes a plurality of cascaded butterfly stages. The butterfly stage can be a radix-2, radix-$2^2$ or radix-$2^3$ butterfly stage. In a preferred embodiment applied for the variable length FFT system as shown in FIG. 3, the method comprises the following step of:

a step 800, selecting one of the butterfly stages (e.g. the radix-$2^3$ butterfly stage 30) to divide and generating a bypassing signal based on a requirement of different data length FFT operations;

a step 810, selectively switching the divide switch by different levels of the bypassing signal to divide a connection between two adjacent processing elements in the same butterfly stage or between two cascaded butterfly stages, and output either a data output from one of the two processing element previous to the divide switch to the subsequent processing element next to the divide switch for performing either a first data length FFT operation, or a data bypassing the processing element previous to the divide switch to directly enter the subsequent processing element next to the divide switch for performing a second data length FFT operation, wherein the second data length is shorter than the first data length;

a step 820, modifying an output of the gate control unit of one of the processing elements next to the divide switch (as the butterfly II processing element 34) by the bypassing signal;

a step 830, selectively switching the multiplexer of the processing element by the modified output of the gate control unit to determine which one of two different coefficients (1, −j) is output to the multiplier for adjusting the butterfly II processing element into as a butterfly I processing element or a butterfly II processing element;

a step 840, multiplying the output coefficient of the processing element by the multiplier with a data output from the divide switch for a trivial twiddle factor multiplication;

a step 850, modifying two outputs of the gate control unit of the other processing element (as the butterfly III processing element 36) by the bypassing signal;

a step 860, selectively switching the multiplexer of the other processing element by the modified outputs of the gate control unit to determine which one of four different coefficients $$\left(1, -j, \frac{\sqrt{2}}{2}(1-j), \frac{\sqrt{2}}{2}(1+j)\right)$$

is output to the multiplier for adjusting the butterfly III processing element into as an butterfly I processing element, a butterfly II processing element, or a butterfly III processing element; and a step 870, multiplying the output coefficient of the other processing element by the multiplier with a data output from the divide switch for a trivial twiddle factor multiplication.

In other embodiments, if in step 800, a radix-2, a radix-$2^2$ or a radix-$2^3$ butterfly stage is selected to divide, only the steps 800~840 are performed. If a radix-$2^3$ butterfly stage is selected to divide into a radix-2 butterfly processing element, only the steps 800, S810 and S850~870 are performed.

In other embodiment, a difference from the aforementioned embodiment is that the method further comprises the steps of:

generating a control signal and the bypassing signal by a mode switch depended on requirements of different data lengths for different FFT operation modes; and selectively switching at least one multiplexer by different levels of the control signal to output either of two different kinds of twiddle factors to a corresponding multiplier interposing between the neighboring butterfly stages for generating a twiddle factor multiplication product, wherein the different FFT operation modes includes an acquisition mode and a tracking mode in a global navigation satellite system (GNSS) receiver.

In inclusion, a variable length FFT system and a method for performing the variable length FFT system according to the present invention for global navigation satellite system (GNSS) signal acquisition and tracking, can use less butterfly stage numbers, less complex multipliers and an operating-time saving to enhance the hardware utility and increase throughputs, and achieve a greater flexibility of a variable data length than the conventional FFT system.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A variable length fast Fourier transform (FFT) system, comprising:
   a plurality of cascaded butterfly stages, each containing at least one of processing elements;
   at least one divide switch for dividing the connection of said processing elements or said cascaded butterfly stages according to a bypassing signal to perform either a first data length FFT operation, or a second data length FFT operation, wherein the second data length is shorter than the first data length;
   a mode switch for generating the bypassing signal and a control signal depended on requirements of different data lengths for different FFT operation modes; and
   at least one multiplexer which is selectively switched by different levels of the control signal from the mode switch to output either of two different kinds of twiddle factors to a corresponding multiplier interposing between the neighboring butterfly stages for generating a twiddle factor multiplication product.

2. The variable length FFT system as claimed in claim 1, wherein the butterfly stages are selected from a radix-2, a radix-$2^2$ or radix-$2^3$ butterfly stage, wherein said radix-2 butterfly stage comprises a butterfly I processing element, said radix-$2^2$ butterfly stage comprises a butterfly I processing element and a butterfly II processing element coupled to the butterfly I processing element, and said radix-$2^3$ butterfly stage comprises a butterfly I processing element, a butterfly II processing element coupled to the butterfly I processing element, and a butterfly III processing element coupled to the butterfly II processing element.

3. The variable length FFT system as claimed in claim 2, wherein the divide switch interposes in data transmission between two adjacent processing elements in one of the butterfly stages.

4. The variable length FFT system as claimed in claim 3, wherein one part of said processing elements is divided by the divide switch into an independent radix-2 butterfly stage or an independent radix-$2^2$ butterfly stage which performs the second data length FFT operation.

5. The variable length FFT system as claimed in claim 4, wherein said butterfly III processing elements each comprises a first coefficient handler which consists of a gate control unit, a multiplexer and a multiplier.

6. The variable length FFT system as claimed in claim 5, wherein the gate control unit has two outputs which can be modified by the bypassing signal based on requirements of different data lengths, and the multiplexer is selectively switched by the modified outputs of the gate control unit to determine which one of four different coefficients $$\left(1, -j, \frac{\sqrt{2}}{2}(1-j), \frac{\sqrt{2}}{2}(1+j)\right)$$

is output to the multiplier for adjusting the butterfly III processing element into as an butterfly I processing element, a butterfly II processing element, or a butterfly III processing element, and the multiplier is used to multiply the output coefficient by a data output from the divide switch for a trivial twiddle factor multiplication.

7. The variable length FFT system as claimed in claim 6, wherein said butterfly II processing elements each has a second coefficient handler which consists of a gate control unit, a multiplexer and a multiplier.

8. The variable length FFT system as claimed in claim 7, wherein the gate control has a output which can be modified by the bypassing signal based on a requirement of data length variance, and the multiplexer is selectively switched by the modified output of the gate control unit to determine which one of two different coefficients (1, −j) is output to the multiplier for adjusting the butterfly II processing element into as either a butterfly I processing element or a butterfly II processing element, and the multiplier is used to multiply the output coefficient by a data output from the divide switch for a trivial twiddle factor multiplication.

9. The variable length FFT system as claimed in claim 8, wherein the divide switch is selectively switched by different levels of the bypassing signal to output either the data output from a processing element previous to the divide switch to the subsequent processing element next to the divide switch or the data bypassing the processing element previous to the divide switch to directly enter the subsequent processing element next to the divide switch.

10. The variable length FFT system as claimed in claim 1, wherein the different FFT operations comprises an acquisition mode and a tracking mode in a global navigation satellite system (GNSS) receiver.

11. A method for performing a variable length fast Fourier transform (FFT) system with a plurality of cascaded butterfly stages each containing at least one of processing elements, comprising the following step:
generating a bypassing signal, based on a requirement of different data length FFT operations;
dividing a connection between said processing elements or said cascaded butterfly stages according to the bypassing signal, to perform either a first data length FFT operation or a second data length FFT operation, wherein the second data length is shorter than the first data length;
generating a control signal depended on requirements of different data lengths for different FFT operation modes; and
selectively switching at least one multiplexer by different levels of the control signal to output either of two different kinds of twiddle factors to a corresponding multiplier interposing between the neighboring butterfly stages for generating a twiddle factor multiplication product.

12. The method as claimed in claim 11, comprising a step of selecting at least one of the butterfly stages from a radix-2, a radix-$2^2$ or a radix-$2^3$ butterfly stage to divide, wherein said radix-2 butterfly stage comprises a butterfly I processing element, said radix-$2^2$ butterfly stage comprises a butterfly I processing element and a butterfly II processing element coupled to the butterfly I processing element, and said radix-$2^3$ butterfly stage comprises a butterfly I processing element, a butterfly II processing element coupled to the butterfly I processing element, and a butterfly III processing element coupled to the butterfly II processing element.

13. The method as claimed in claim 12, further comprising a step of dividing the processing elements by a divide switch into an independent radix-2 butterfly stage or an independent radix-$2^2$ butterfly stage which performs the second data length FFT operation.

14. The method as claimed in claim 13, wherein said butterfly III processing elements each comprises a first coefficient handler which consists of a gate control unit, a multiplexer and a multiplier, the method further comprising the steps of:
modifying two outputs of the gate control unit by the bypassing signal based on requirements of different data lengths;
selectively switching the multiplexer by the modified outputs of the gate control unit to determine which one of four different coefficients $$\left(1, -j, \frac{\sqrt{2}}{2}(1-j), \frac{\sqrt{2}}{2}(1+j)\right)$$

is output to the multiplier for adjusting the butterfly III processing element into as an butterfly I processing element, a butterfly II processing element, or a butterfly III processing element; and
multiplying the output coefficient by the multiplier with a data output from the divide switch for a trivial twiddle factor multiplication.

15. The method as claimed in claim 14 wherein said butterfly II processing elements has a second coefficient handler which consists of a gate control unit, a multiplexer and a multiplier, the method further comprising the steps of:
modifying an output of the gate control by the bypassing signal based on a requirement of data length variance;
selectively switching the multiplexer by the modified output of the gate control to determine which one of two different coefficients (1, −j) is output to the multiplier for adjusting the butterfly II processing element into as a butterfly I processing element or a butterfly II processing element; and
multiplying the output coefficient by the multiplier with a data output from the divide switch for a trivial twiddle factor multiplication.

16. The method as claimed in claim 15, further comprising a step of selectively switching the divide switch by different levels of the bypassing signal to output either the data output from a processing element previous to the divide switch to the subsequent processing element next to the divide switch or the data bypassing the processing element previous to the divide switch to directly enter the subsequent processing element next to the divide switch.

17. The method as claimed in claim 11, wherein the different FFT operations comprises an acquisition mode and a tracking mode in a global navigation satellite system (GNSS) receiver.

18. A variable length fast Fourier transform (FFT) system, comprising:
a plurality of cascaded butterfly stages, each containing a plurality of processing elements; and
at least one divide switch for dividing the connection of said processing elements according to a bypassing signal to perform either a first data length FFT operation, or a second data length FFT operation, wherein the second data length is shorter than the first data length.

19. The variable length FFT system as claimed in claim 18, wherein said one of processing elements comprises a first coefficient handler which consists of a gate control unit, a multiplexer and a multiplier.

20. The variable length FFT system as claimed in claim 19, wherein the gate control unit has two outputs which can be modified by the bypassing signal based on requirements of different data lengths, and the multiplexer is selectively switched by the modified outputs of the gate control unit to determine which one of four different coefficients $$\left(1, -j, \frac{\sqrt{2}}{2}(1-j), -\frac{\sqrt{2}}{2}(1+j)\right)$$

is output to the multiplier for adjusting the processing element, and the multiplier is used to multiply the output coefficient by a data output from the divide switch for a trivial twiddle factor multiplication.

21. The variable length FFT system as claimed in claim 18, wherein said one of processing elements has a second coefficient handler which consists of a gate control unit, a multiplexer and a multiplier.

22. The variable length FFT system as claimed in claim 21, wherein the gate control has a output which can be modified by the bypassing signal based on a requirement of data length variance, and the multiplexer is selectively switched by the modified output of the gate control unit to determine which one of two different coefficients (1, −j) is output to the multiplier for adjusting the processing element, and the multiplier is used to multiply the output coefficient by a data output from the divide switch for a trivial twiddle factor multiplication.

23. The variable length FFT system as claimed in claim 22, wherein the divide switch is selectively switched by different levels of the bypassing signal to output either the data output from a processing element previous to the divide switch to the subsequent processing element next to the divide switch or the data bypassing the processing element previous to the divide switch to directly enter the subsequent processing element next to the divide switch.

24. The variable length FFT system as claimed in claim 18, further comprising a mode switch for generating the bypassing signal and a control signal depended on requirements of different data lengths for different FFT operation modes, and at least one multiplexer which is selectively switched by different levels of the control signal from the mode switch to output either of two different kinds of twiddle factors to a corresponding multiplier interposing between the neighboring butterfly stages for generating a twiddle factor multiplication product.

25. A method for performing a variable length fast Fourier transform (FFT) system with a plurality cascaded butterfly stages each containing a plurality of processing elements, comprising the following step:
generating a bypassing signal, based on a requirement of different data length FFT operations; and
dividing a connection between said processing elements according to the bypassing signal, to perform either a first data length FFT operation or a second data length FFT operation, wherein the second data length is shorter than the first data length.

26. The method as claimed in claim 25, wherein said one of processing element comprises a first coefficient handler which consists of a gate control unit, a multiplexer and a multiplier, the method further comprising the steps of:
modifying two outputs of the gate control unit by the bypassing signal based on requirements of different data lengths;
selectively switching the multiplexer by the modified outputs of the gate control unit to determine which one of four different coefficients $$\left(1, -j, \frac{\sqrt{2}}{2}(1-j), -\frac{\sqrt{2}}{2}(1+j)\right)$$

is output to the multiplier for adjusting the processing element; and
multiplying the output coefficient by the multiplier with a data output from the divide switch for a trivial twiddle factor multiplication.

27. The method as claimed in claim 25, wherein said one of processing elements has a second coefficient handler which consists of a gate control unit, a multiplexer and a multiplier, the method further comprising the steps of:
modifying an output of the gate control by the bypassing signal based on a requirement of data length variance;
selectively switching the multiplexer by the modified output of the gate control to determine which one of two different coefficients (1, −j) is output to the multiplier for adjusting the processing element; and
multiplying the output coefficient by the multiplier with a data output from the divide switch for a trivial twiddle factor multiplication.

28. The method as claimed in claim 27, further comprising a step of selectively switching the divide switch by different levels of the bypassing signal to output either the data output from a processing element previous to the divide switch to the subsequent processing element next to the divide switch or the data bypassing the processing element previous to the divide switch to directly enter the subsequent processing element next to the divide switch.

29. The method as claimed in claim 25, further comprising the steps of:
generating a control signal depended on requirements of different data lengths for different FFT operation modes; and
selectively switching at least one multiplexer by different levels of the control signal to output either of two different kinds of twiddle factors to a corresponding multiplier interposing between the neighboring butterfly stages for generating a twiddle factor multiplication product.

* * * * *